United States Patent [19]

Clay

[11] Patent Number: 4,923,262

[45] Date of Patent: May 8, 1990

[54] SCANNER SYSTEM HAVING ROTATING DEFLECTOR HOLOGRAM

[75] Inventor: Burton R. Clay, Wayland

[73] Assignee: HoloGraphix, Inc., Burlington, Mass.

[21] Appl. No.: 212,158

[22] Filed: Jun. 23, 1988

Related U.S. Application Data

[63] Continuation of Ser. No. 795,310, Nov. 6, 1985.

[51] Int. Cl.⁵ .......................... G02B 26/10; G02B 5/32
[52] U.S. Cl. .................................... 350/3.71; 350/320
[58] Field of Search ............................... 350/3.71, 320

[56] References Cited

U.S. PATENT DOCUMENTS

| | | | |
|---|---|---|---|
| 3,619,033 | 11/1971 | McMahon | 350/162 |
| 4,094,576 | 7/1978 | Heiling | 350/371 |
| 4,235,504 | 11/1980 | Ikeda et al. | 350/371 |
| 4,289,371 | 9/1981 | Kramer | 350/371 |
| 4,348,080 | 9/1982 | Funato | 350/371 |
| 4,378,142 | 3/1983 | Ono | 350/371 |
| 4,470,659 | 9/1984 | Funato | 350/3.71 |
| 4,548,463 | 10/1985 | Cato et al. | 350/371 |
| 4,583,816 | 4/1986 | Kramer | 350/3.71 |

FOREIGN PATENT DOCUMENTS 0122783 10/1984 European Pat. Off.
58-174919 10/1983 Japan.
59-111620 10/1984 Japan.

OTHER PUBLICATIONS

Ono, Yuzo et al, "Holographic Disk Scanners for How Free Scanning" Applied Optics vol. 22, No. 14, 7/15/83.

Grating Efficiency Theory as it Applies to Blazed and Holographic Gratings E. G. Loewen, M. Neviere and D. Maystre, Oct. 1977 vol. 16, No. 10, Applied Optics pp. 2711-2721.

Holographic Laser Scanners Using Generalized Zone Plates, Yuzo Ono & Nobuo Nishida Applied Optics, vol. 21, No. 24, Dec. 1982 pp. 4542-4548.

*Primary Examiner*—Bruce Y. Arnold
*Assistant Examiner*—Terry S. Callaghan
*Attorney, Agent, or Firm*—Lahive & Cockfield

[57] ABSTRACT

A scanner system which uses rotating, high efficiency holograms to deflect a light beam thereby achieving a linear scan. The hologram is unique in that it allows high system efficiency without requiring the input polarization to be aligned to the fringe pattern.

21 Claims, 4 Drawing Sheets

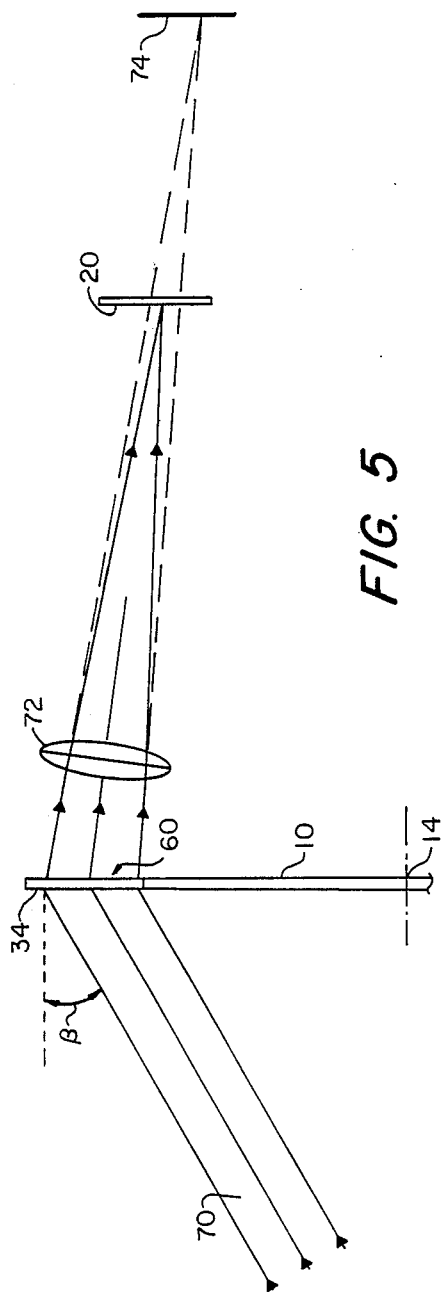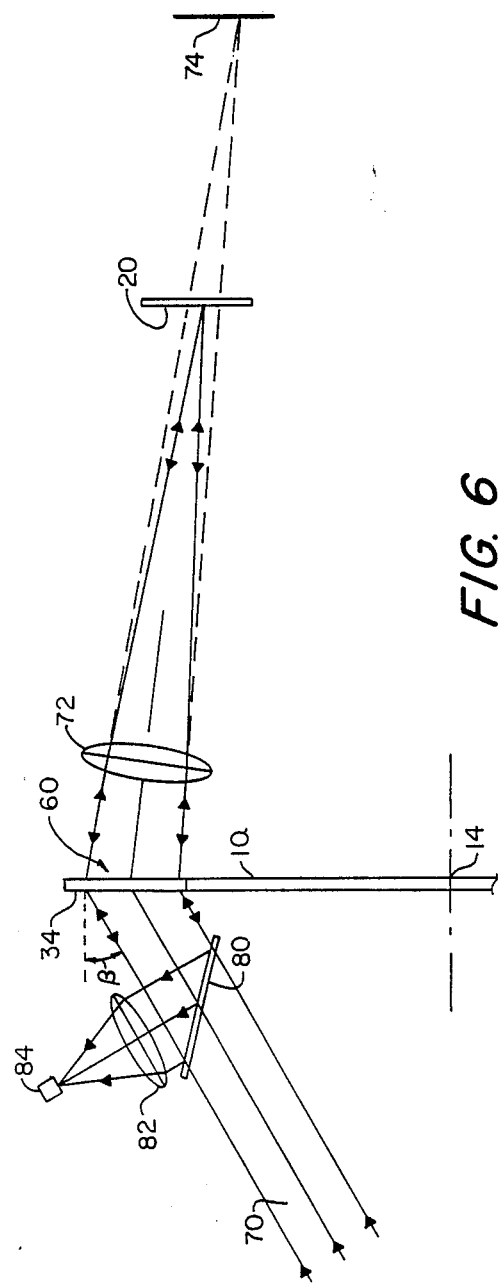

SCANNER SYSTEM HAVING ROTATING DEFLECTOR HOLOGRAM

This application is a continuation of application Ser. No. 795,310, filed Nov. 6, 1985.

BACKGROUND OF THE INVENTION

The present invention relates to laser scanner systems, and, more particularly, to laser scanner systems of the holographic type.

The advantages of using holographic deflection technology for laser scanner systems rather than rotating polygons or galvanometer-driven mirrors are well-known. Implementation of holographic systems, at present, has several limitations. First, the maximum system efficiency attainable demands either (a) that so-called Bragg holograms be used which can have nearly one hundred percent (100%) internal efficiency (Bragg holograms are fragile and not amenable to replication), or (b) that deep-groove holograms be used which can approach nearly one hundred percent (100%) internal efficiency. In addition, the type of hologram chosen can introduce optical aberrations and distortion in the system; for example, (a) so-called Seidel aberrations and (b) line bow.

As is well-known, hologram efficiency is polarization-dependent. Present day holographic scanners therefore use polarized lasers with the polarization orientation determined by hologram fringe direction. A scanner using a hologram dependent on a plane polarized beam cannot be used to read paper documents, since the light reflected from a diffusing object, such as paper, would not retain its polarization. Diffusely reflected light, even when the source is polarized, has random polarization. The polarization directions can be resolved into so-called p and s components and the efficiency calculated for each meridian. To maximize efficiency for randomly polarized light, the hologram must have substantially equal s and p plane terms.

A scanner has been described in U.S. Pat. No. 4,239,326 (Kramer) as one which uses an array of linear sine wave grating segments recorded holographically on a disk. However, in such scanner, there is a dependency of efficiency on p-plane polarization. The use of this configuration has two disadvantages: (a) the scanned line is not straight, but has a bow dependent on small changes in the incident angle; and (b) the high diffraction efficiency is obtained for only one polarization direction, so that if an attempt is made to use such a scanner to read a diffuse surface, such as a sheet of paper, the polarization is lost and the efficiency is correspondingly lowered. Thus, a scanner incorporating the above holographic elements can be used for a recording scanner, but not for reading through common optics.

Another scanner system is shown in U.S. Pat. No. 3,953,105 (Darien) in which an optical spinner is used to direct coherent light toward a scanning focal point locus. In such system, however, an auxiliary reflective element, such as a spherical mirror, must be used, thereby increasing system cost and alignment difficulty.

It is, accordingly, a primary object of the present invention to provide a scanner system having immunity from polarization dependence, having improved line bow correction and which reduces image aberrations.

SUMMARY OF THE INVENTION

The above and other objects of the present invention are achieved by use of a scanner system having a disk containing holographic deflector segments of unique design thereby allowing the scanner system to record and to read diffuse objects, such as paper documents. The hologram design allows adjustment of recording parameters to enable the scanner to read objects causing varying ratios of s and p polarization return. The high efficiency holograms in the system described produces a substantially bow-free line with negligible aberrations. The recording system allows the use of a recording wavelength different from that used in the scanner.

More particularly, the scanner system utilizes a rotating disk having segments of holograms recorded thereon. The segments have a radius which is displaced from and outside the circumference of the rotating disk and is recorded, such that the hologram line spacing increases with increasing radius. An optical beam, such as provided by a laser, is directed at such disk at a predetermined angle and then converges on a focal plane so as to provide read or write capability with minimum line bow and aberrations.

BRIEF DESCRIPTION OF THE DRAWINGS

The above and other objects of the present invention are achieved in the illustrative embodiment as described with respect to the Figures in which:

FIG. 5 illustrates a write only scanner system utilizing the holographic apparatus of the present invention; and FIG. 6 illustrates a read/write scanner system utilizing the holographic apparatus of the present invention.

DETAILED DESCRIPTION OF THE PREFERRED EMBODIMENT(S)

The subject of the present invention is a holographic scanner which may be used to both read and write. The apparatus of the present invention is configured so that the diffraction efficiency for both the s and p polarizations is substantially the same so that light scattered from a diffuse surface causing the reflected light to become randomly polarized while still operating with high efficiency.

Figure 1:
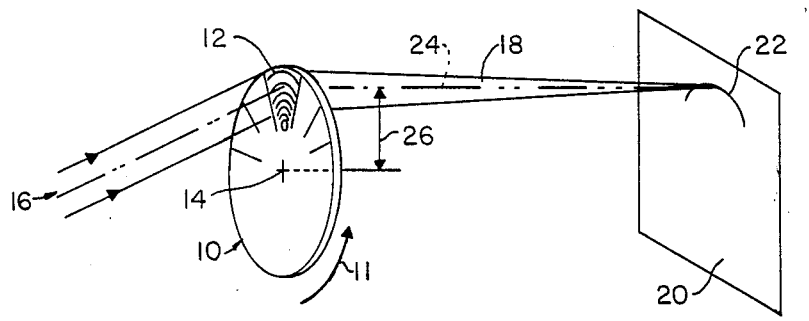
FIG. 1 shows a system in which a standard hologram is used thereby giving an undesirable bowed scan locus.

In order for the hologram to be configured so as to produce high efficiency for both the p and s plane polarizations, an incident angle of approximately twenty-three degrees is used. See, for example, FIG. 32 at page 2717 of the Oct., 1977 issue (Volume 16, No. 10) of Applied Optics magazine. This shows that at an angle of $23° \pm \approx 2°$, the p and s curves are substantially equal and close to their maximum efficiency. However, a linear grating with a grating constant optimized for an incidence angle of twenty-three degrees produces a severely bowed scan line and is, therefore, unsuitable for most scanning applications. Thus, the hologram, which is not a linear grating, can use an angle of approximately twenty-three degrees angular incidence so as to correct for line-bow by employing a fringe field shaped according to system requirements. For example, line-bow correction can be accomplished by recording a hologram disk segment which has a fringe shape and spatial distribution giving it the property of a lens. If a number of such segments are recorded on the disk, the incident beam would be focused and the focused spot from each segment due to the rotation of the disk would produce a spot locus which is a circular segment in the focal plane. The scan locus in the focal plane would pass through the segment axis as shown in FIG. 1.

The disk 10 with hologram 12 and rotation axis 14 is shown to rotate in the direction indicated by the arrow 11. A source of light 16, such as a laser beam, is shown to impinge on disk 10 and therefore hologram 12. The beam is deflected to form a convergent beam 18 which impinges on surface 20 to produce a scan locus 22 which is bowed. The axis 24 of the convergent beam 18 has a radius 26 from the rotation axis 14.

Figure 2:
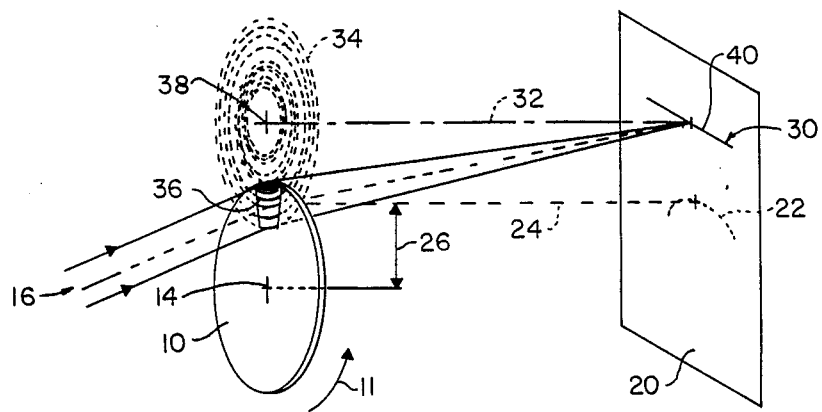
FIG. 2 shows a system in which the unique holographic apparatus of the present invention is used to substantially eliminate the bow of the scan locus.
Figure 3:
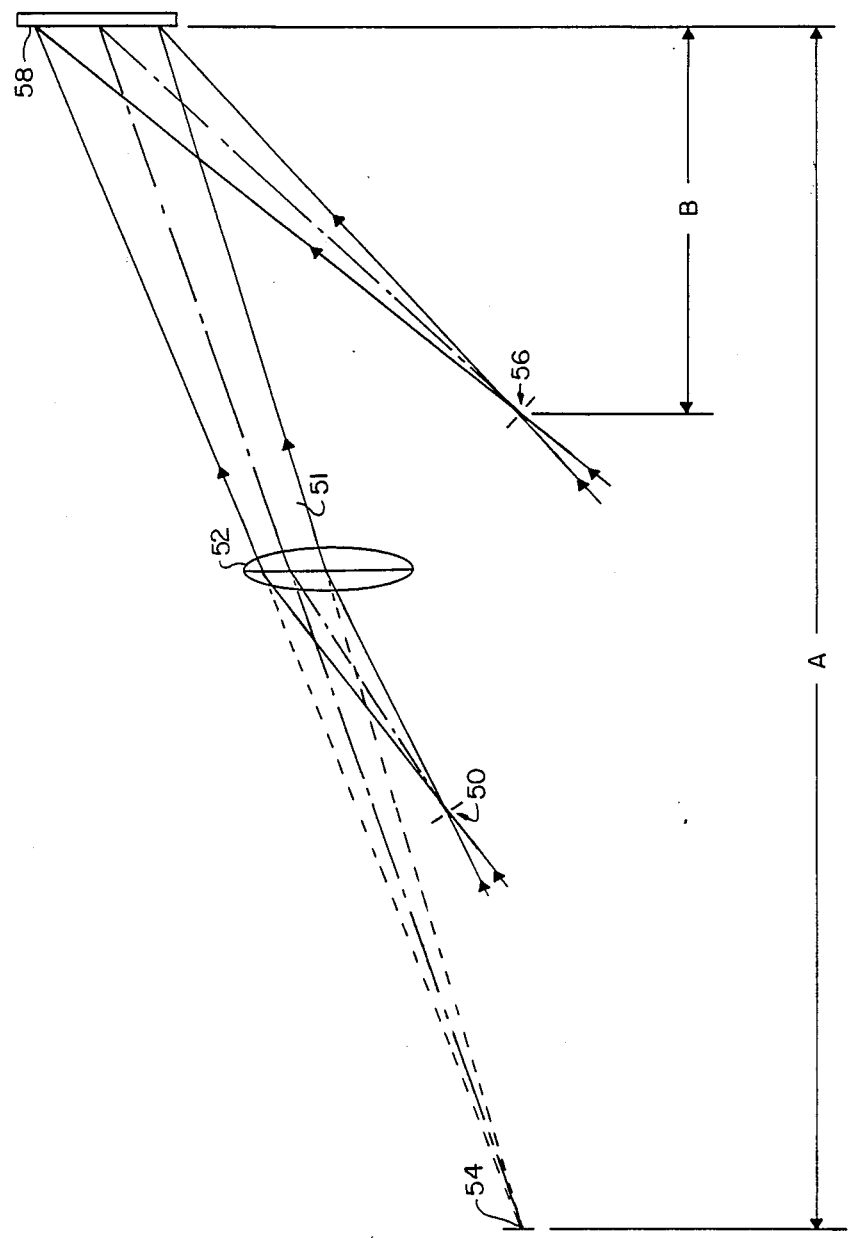
FIG. 3 illustrates the manner in which the unique holographic apparatus of the present invention is recorded.

However, as shown in FIG. 2, if the center of the holographically recorded disk 10 is displaced from the optical axis with the radius 26 unchanged, then the curvature of the line segment can be made to change provided the holographically recorded lens behaves as one which has barrel distortion. Thus, in FIG. 2, the geometrical relationship of the hologram 34 to the disk 10 is shown. The center 38 of hologram 34 having a fringe pattern of circular lines 36 is oriented so that the hologram axis 32 is directed in a straight path to scan locus 40. The configuration of the holographic recording on disk 10 is shown in detail in FIG. 4. In the example shown in FIG. 2, it can be seen that if the disk 10 is designed to have barrel distortion, the curvature produced by the disk 10 subtracts from the curvature produced by rotating the disk. If the holographically recorded lens is designed to produce a curvature equal to that caused by rotating the disk, then the line will be substantially straight. The extent of curvature of a line varies directly as the ray height for a lens of given barrel distortion. Therefore, the lens offset is adjusted to obtain the required line curvature for neutralizing the curvature due to disc rotation. Thus, as shown in FIG. 3, the lens 52 is shown offset from the beam received via filter 50.

This hologram lens has two significant properties, first, it corrects the line curvature; and second, it focuses the incident beam to a point on the focal plane, and, thus, may eliminate the need for a focusing lens. The second property of the hologram lens segment, however, has limited practical usefulness, since aberrations necessarily result from such an arrangement. In some cases, the hologram lens segment can replace the scan lens, particularly those cases in which diffraction limited resolution is not required, and in which a small scan angle is satisfactory. For high resolution and/or wide angle applications, the system described here, however, takes advantage of the second property by distributing the focusing power between the hologram and an auxiliary scan lens.

The subject of the present invention is a system which improves immunity from polarization dependence and which uses a hologram having properties which allow correction of scan line bow (curvature) and which cause an arbitrarily chosen amount of focusing, but not so much as to induce undesirable astigmatism. The hologram segment and lens performs the system focusing function. Since the power of the lens used in conjunction with the hologram segments is less than that needed for a stand-alone system, (such as are used in present state-of-the-art holographic scanners), then the f-number may be larger (other parameters remaining the same). In general, large f-number lenses are simpler and less costly than smaller f-number lenses for the same application. The overall scanner cost is, therefore, reduced.

Some scanner applications may demand the reading of objects which reflect polarized light in ways specific to the material of which the object is composed. For example, if the object is birefringent, the input light reflected back into the readout paths would acquire specific ratios of s and p polarizations. The subject of the present invention is a hologram which allows adjustment of the s and p polarization component diffraction efficiencies to accommodate a wide variety of objects to be scanned. The adjustments made in the recording system to change the diffraction efficiency of the p to s polarization ratio are (a) angular incidence of the object beam, (b) curvature of the reference beam wave front to correct for line bow, (c) adjustment of h/d and (d) adjustment of mλ/d.

A recording system for the above-described holographic lens segments must take into account three important factors: (i) the desired spread of polarization orientation efficiency; (ii) the spatial distribution of the fringes and the shape necessary for obtaining the required barrel distortion, as well as the effective lens powers; and (iii) the wavelength translation-induced aberrations (if the hologram is recorded at a different wavelength than that of the readout).

These factors are dealt with as follows. If maximum polarization immunity, i.e., equal s and p plane efficiency, is required through the system during readout, then the recording system is set up to allow angles of incidence (at readout) to be specified at some angle between twenty-one degrees and twenty-three degrees. The consequence of this arrangement is that the resulting hologram will produce a scan line which is bowed—if the hologram is a linear grating type. If other specific ratios of s and p plane are required, then an angle other than substantially twenty-three degrees is used.

In order to obtain the fringe frequency distribution and shape necessary to correct for the bow, the recording geometry of FIG. 3 is used. A spherical wave originates from pinhole filter 50, located inside the focal plane of the lens 52 so as to produce a divergent beam 51 of nearly spherical shape. This causes a virtual origin at point 54. A second pinhole filter 56 is the point of origin for a second spherical wave. The two waves interfere at the plane or surface 58 where a phase hologram is recorded. The correcting lens 52 is designed to produce a nearly spherical output wave. A slight departure from sphericity can be brought about by figuring (i.e., figuring means removal of glass by polishing in specific zones to enable a controlled departure from sphericity) one of the surfaces. The shape is determined experimentally by iterating the figure until the hologram produces minimal or zero aberrations over the specified scan length. As stated hereinbefore, the lens 52 is not centered on the beam axis. This off-center arrangement assists in figuring the lens.

In order to obtain a high efficiency, deep groove, phase hologram, the recording medium chosen is photoresist. Photoresists are sensitive only to the shorter wavelengths. One example is Shipley 4750J (manufactured by the Shipley Company of Newton, Mass.) which is matched in the λ400 nm to λ450 nm region. The λ457.9 nm emission from an argon ion laser is chosen for recording. However, the readout wavelength for numerous applications is 632.8 nm (He-Ne), or λ820 nm (laser/diode).

In general, if a hologram is read out at the same wavelength at which it was recorded, no aberrations are introduced. Seidel aberrations can be present if the readout wavelength is different from that in recording. A simple method for correcting these aberrations makes use of the fact that, instead of interfering a plane wavefront reference beam with a spherical wave-front object beam, as is generally done to record a Fresnel-type hologram, use is made of the additional freedom gained by making both the reference and object beams spherical (*Handbook of Optical Holography*, Academic Press 1979, J. Caulfield, Editor, B. R. Clay, pp. 441–444). The amount of correction possible with this method is limited to small angular fields, but not limited to small angles of incidence in the readout beam. The recording procedure calls for a geometry having a point source for the object and a point source for the reference beam in which the points lie on a line perpendicular to the hologram recording plane as shown in FIG. 3. These point sources are coherent and emit light at wavelength $\lambda_1$.

Readout is by a collimated source of wavelength $\lambda_2$. Analysis shows that if a hologram of focal length f is desired at $\lambda_2$ and if $\lambda_2 = \alpha\lambda_1$, where $\alpha$ is the wavelength ratio of $\lambda_2$ divided by $\lambda_1$, then the distances A and B are determined by the simultaneous solution of the two equations:

$$\frac{1}{a} - \frac{1}{b} = \frac{1}{\alpha f} \quad (1)$$

$$\frac{1}{(a)^3} - \frac{1}{(b)^3} = \frac{1}{(\alpha f)^3} \quad (2)$$

where A is the perpendicular distance between the reference point source 54 and the hologram plane 58, and B is the distance from the object point 56 to the hologram plane 58. Holograms recorded as prescribed above have yielded diffraction limited point images when read out at λ632.8 nm and recorded at λ441.6 nm. The illustrated embodiment requires the addition of the correcting lens 52, as shown in FIG. 3, to the recording set-up for shaping the object beam wave-front which results in line-bow correction and reduces aberrations.

Interference between the spherical reference beam and the nearly spherical object beam results in a fringe shape and spatial frequency distribution, which allows the necessary barrel distortion in the recorded hologram for the purpose of line-bow cancellation while correcting additional aberrations incurred by off-axis readout at the edges of the scanned line. Slight hand-figuring of the lens is required and is done by empirical iteration.

Holograms made as described above and read-out in a scanner with a high f-number scan lens have yielded essentially bow-free scan lines. Nearly diffraction limited performance over the entire scan line was observed.

Figure 4:
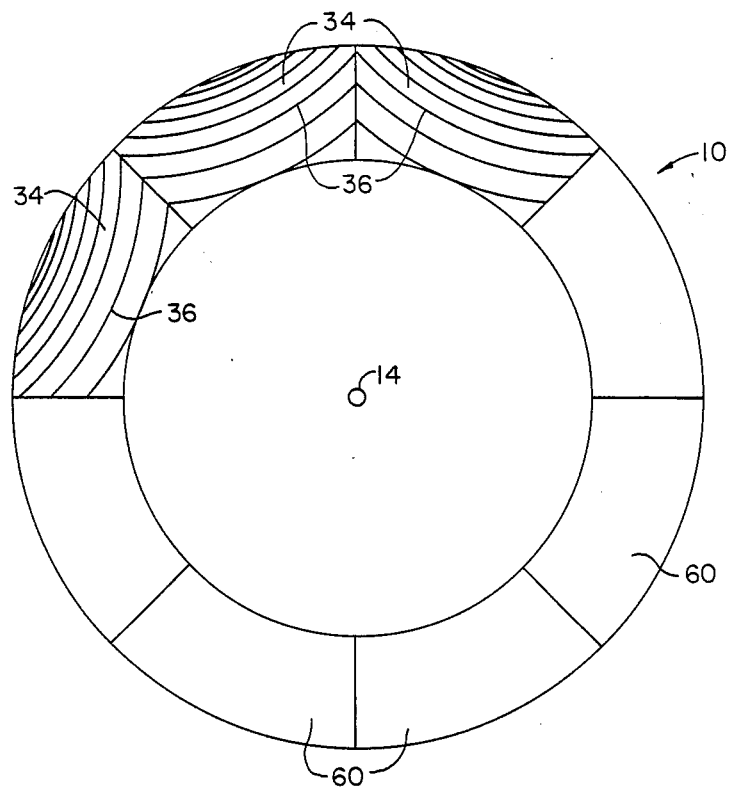
FIG. 4 illustrates in more detail the recorded holographic apparatus of the present invention.

FIG. 4 illustrates the holographic segments 34 recorded on disk 10. By way of example, the periphery of disk 10 includes eight holograms 34 (only three of which are shown in detail) in the eight segments 60 with lines 36 whose spacing increases with increasing radius from point 38 shown in FIG. 2. It should be understood that more or fewer segments 60 may have been used without departing from the scope of the present invention.

FIG. 5 illustrates a write only scanner system utilizing the holographic disk shown in FIG. 4. A collimated beam (such as a laser beam) 70 is shown impinging on disk 10 at the outer periphery thereof which comprises hologram 34 recorded on segments 60. The beam 70 is shown to impinge on segments 60 at an angle β which is picked such that the p and s plane polarization are substantially equal. By using such angle, immunity from polarization dependence is improved. The beam is refracted via scan lens 72 onto system focal plane 20. Without scan lens 72, the focal point would be on surface 74.

FIG. 6 illustrates a read/write scanner system utilizing the holographic disk of FIG. 4. The basic difference between FIGS. 5 and 6 is that in FIG. 6 an optical splitter 80 is introduced. The purpose of the splitter 80 is to enable reading to take place with the same source of illumination, i.e., the collimated beam 70, as is used for writing. The operation of the apparatus of FIG. 6 is as follows. During recording, the beam 70 passes through the splitter 80 on the way to the focal plane 20 and after reflection from the object at the focal plane 20 returns along the same path. The splitter 80 reflects some of the returning light to the lens 82 and detector 84. A splitter which transmits substantially 50% of the light and reflects substantially 50% of the light can be used. However, this reduces the overall system efficiency to about 25%. If, on the other hand, a polarization splitter is used, it will transmit nearly 100% of the polarized laser output. The return light in some cases will be randomly polarized and so about 50% of it will be reflected to the detector 84. The system loss is only 50% as compared to the 25% above.

It should be understood that splitter 80 could be a swing out splitter which would enable all the energy to be incident on the recording medium 20 during the write cycle and (when swung in) would allow reading in the manner described. It should also be understood that a document which may be on focal plane 20 may be moved so that the entire document may be read or written on in successive line scans produced by the apparatus of the present invention. It should also be understood that the hologram medium may be either transmissive or reflective. If transmissive, the hologram diffracts and the light beam is directed to a focal plane on the opposite side of the hologram from the light source. If reflective, the hologram diffracts, but the light beam reflects and is directed to a focal plane on the same side of the hologram as the light source.

Having described the invention, what is claimed as new and novel and for which it is desired to secure Letters Patent is:

1. A scanning system comprising:
   A. an optical spinner having a surface rotatable about an axis that is substantially perpendicular to said surface at its point of interaction with said axis; said spinner divided into a plurality of segments;
   B. a plurality of optical elements each capable of processing light by diffraction in a predetermined manner, each of said elements included respectively in a portion of said segments;
   C. wherein said portions of said segments are recorded and arranged for receiving a light beam at a non-normal angle in the portion of said segments which include said elements, and efficiently redirecting randomly polarized light received at said non-normal angle;
D. means defining a scanning plane; and
E. correction means, included in said elements, for enabling substantially straight line scan locus on said scanning plane as said spinner rotates.

2. A system as in claim 1 wherein said correction means includes a substantially circular pattern of holographically recorded diffractive lenses, the center of which is outside the periphery of said spinner.

3. A system as in claim 2 wherein said center is a substantially different distance from the axis of rotation of said spinner than is the periphery of said spinner.

4. A system as in claim 2 wherein the spacing between successive fringes of said pattern of diffractive lenses increases with increasing distance from said center.

5. A system as in claim 1 wherein said elements are holographically recorded so as to remove aberrations otherwise produced during readout of such system.

6. A system as in claim 5 wherein said holographic recording is accomplished by use of a correcting lens.

7. A system as in claim 1 wherein said elements are holographically recorded such that there is a spatial distribution of fringes in the segments causing the segments during readout by the system to have the property of a lens with barrel distortion in the amount required to reduce curvature in the scanned line to a negligible value.

8. A system as in claim 1 further comprising means for reducing diffraction efficiency polarization dependence by recording with those parameters that dependence by recording with those parameters that enable a hologram to have substantially jointly maximized efficiencies in the p and s directions.

9. A system as in claim 1 wherein each of said portions of said segments are transmissive.

10. A system as in claim 1 wherein each of said portions of said segments are reflective.

11. A scanning system according to claim 1, wherein said elements are recorded so as to remove aberration otherwise present during readout of said system by recording using an object beam formed by a lens having a barrel distortion property opposite in sense to line curvature caused by rotation of said spinner.

12. A scanning system according to claim 11, wherein said elements are recorded by recording a first set of elements using an object beam formed by a lens having a barrel distortion property calculated to substantially remove line curvature caused by rotation of said spinner, and by operating a first spinner incorporating said first set of elements so as to observe aberrations of said first spinner due to receiving a light beam at non-normal incidence, and thereafter figuring said lens to remove the observed aberrations and re-recording a further set of elements using an object beam formed by said figured lens, said further set of elements being incorporated as the elements of said spinner.

13. A holographic spinner having a plurality of hologram sectors for diffracting light along a scan path as the spinner is rotated about a central spinner axis, wherein the hologram sectors are recorded with a fringe pattern which diffracts with a barrel distortion property substantially equal and opposite to the scan line bow caused by rotation of the spinner, so as to produce substantially linear scan line upon rotation of the spinner, and wherein the hologram sectors are recorded with recording beams arranged to provide a hologram fringe pattern which efficiently transforms light when illuminated at non-normal incidence with randomly polarized light.

14. A spinner according to claim 13, wherein the hologram sectors include hologram fringes recorded so as to have substantial diffractive efficiency for both s and p polarized light.

15. A spinner according to claim 13, wherein the hologram sectors include fringes recorded so as to have substantial diffractive efficiency of light of a selected polarization.

16. A spinner according to claim 13, wherein the hologram sectors are recorded and are positioned about the spinner so as to have the focusing properties of a large aperture lens with a central lens axis intersecting the plane of rotation of said spinner outside of the perimeter of the spinner.

17. A spinner according to claim 16, wherein the distance from the perimeter of the spinner to said central spinner axis is substantially less than the distance of said central lens axis to said central spinner axis.

18. A method of making a holographic spinner for performing high efficiency scanning of a linear scan locus by the rotation of the spinner, such method comprising the steps of
A. recording an initial set of hologram segments of said spinner using an object beam formed by a correction lens such that each initial segment has a focusing property for substantially correcting line bow induced by spinner rotation,
B. incorporating the initial set of segments into a said spinner and illuminating the spinner with a reconstruction beam so as to observe scan line aberrations,
C. figuring the correction lens and recording a further set of segments with the figures correction lens such that an observed scan line aberration decreases when said further set of segments is incorporated in a said spinner, and
D. incorporating said further set of segments in said spinner thereby making a holographic spinner for scanning a linear scan focus.

19. A method according to claim 18, further including repeating steps A-C to iteratively correct aberrations in said further set of segments.

20. A method according to claim 18, wherein the abberations include scan aberrations induced by illumination of said spinner with a non-normal reconstruction beam.

21. A method according to claim 18 wherein the aberrations include scan aberrations induced by illumination with a reconstruction beam of a different wavelength than light used in recording said set or further set of segments.

* * * * *